(12) United States Patent  
Chou

(10) Patent No.: US 8,162,576 B1  
(45) Date of Patent: Apr. 24, 2012

(54) CARGO BAR WITH QUICK RELEASE

(75) Inventor: Yeh-Chien Chou, Taoyuan County (TW)

(73) Assignee: Strong Yun Industrial Co., Ltd., Taoyuan County (TW)

( * ) Notice: Subject to any disclaimer, the term of this patent is extended or adjusted under 35 U.S.C. 154(b) by 0 days.

(21) Appl. No.: 13/244,271

(22) Filed: Sep. 23, 2011

(51) Int. Cl.  
*B60P 7/08* (2006.01)

(52) U.S. Cl. ........................................ 410/151; 410/143

(58) Field of Classification Search .......... 410/143, 410/145, 151; 211/105.3; 248/354.6, 354.7; 254/12, 95, 108, 109, 112; 74/141.5, 167, 74/169  
See application file for complete search history.

(56) References Cited

U.S. PATENT DOCUMENTS  
5,472,301 A * 12/1995 Wallen .......................... 410/151  
* cited by examiner

*Primary Examiner* — Stephen Gordon

(57) ABSTRACT

The cargo bar includes a toothed rod and a ratchet actuator. The ratchet actuator is composed of a carriage, a wrench bar with a handle, a main pawl, an auxiliary pawl and an elastic member. When the handle is reciprocated, the wrench bar drives the pawls to push teeth on the toothed rod, and then the toothed rod is elongated outwards. The carriage is disposed with a rotatable release key. When the release key is rotated in a specific direction, the auxiliary pawl and the main pawl will be pushed directly and indirectly by the release key, respectively, and then the two pawls withdraw from the toothed rod to make the toothed rod bidirectionally slidable.

6 Claims, 6 Drawing Sheets

CARGO BAR WITH QUICK RELEASE

BACKGROUND OF THE INVENTION

1. Technical Field

The invention relates to telescoping rods, particularly to ratchet type telescoping rods.

2. Related Art

A cargo bar is a telescoping rod used in pickup truck beds or sport utility vehicles for holding cargo therein. Typical cargo bars adopt a unidirectional ratchet mechanism such as U.S. Pat. No. 5,979,876. Briefly, '876 is composed of a toothed rod and a ratchet actuator. There are a series of slant teeth 14 on one side of the toothed rod 10. The toothed rod 10 passes through the ratchet actuator. The ratchet actuator includes a wrench bar 22, a main pawl 26 and an auxiliary pawl 32, all of which are separately pivotally linked in a carriage 16. The two pawls 26, 22 are separately articulated to the wrench bar 22 with two shafts 28, and engage with two different teeth 14. An elastic member 40 is disposed between the two pawls 26, 32. An outer end of the wrench bar 22 is disposed with a handle 24. When the handle 24 is reciprocated, the wrench bar 22 drives the pawls 26, 32 to push the teeth 14 on the toothed rod 10, and then the toothed rod 10 is elongated outwards.

A single reciprocation cycle of the wrench bar can only elongate the toothed rod by the length of one tooth. It is so hard to elongate a much longer distance. Thus a quick release mechanism for making the toothed rod freely movable by temporarily withdrawing the pawls from the toothed rod is required. In '876, however, the quick release mechanism is a quick release lever 48 pivotally linked in the wrench bar 22 by a shaft 50 and near the handle 24. And a torsion spring 56 is put axially around the shaft 50. Two ends of the torsion spring 56 bear against an outer end 54 of the quick release lever 48 and the wrench bar 22, respectively. An inner end 52 of the quick release lever 48 bears against the elastic member 40. When the quick release lever 48 is depressed, the inner end 52 will push the elastic member 40 to move the auxiliary pawl 32 upwards and then to withdraw from the teeth 14. At this time, the toothed rod 10 can be freely moved.

Such a quick release mechanism is complicated in structure because it requires two elements—quick release lever 48 and torsion spring 56.

Furthermore, its assembling process is also laborsome. Thus it is uneconomical for manufactures. On the other hand, because the quick release lever 48 must has a specific length for serving as a lever, it tends to be fractured or bent. Thus it is not durable enough for users.

SUMMARY OF THE INVENTION

A primary object of the invention is to provide a cargo bar with quick release, which only includes a single component. The structure is simplified and manufacturing cost is reduced.

Another object of the invention is to provide a cargo bar with quick release, which has great durability because it does not adopt the lever principle.

To accomplish the above object, the cargo bar of the invention includes a toothed rod and a ratchet actuator. The ratchet actuator is composed of a carriage, a wrench bar with a handle, a main pawl, an auxiliary pawl and an elastic member. When the handle is reciprocated, the wrench bar drives the pawls to push teeth on the toothed rod, and then the toothed rod is elongated outwards. The carriage is disposed with a rotatable release key. When the release key is rotated in a specific direction, the auxiliary pawl and the main pawl will be pushed directly and indirectly by the release key, respectively, and then the two pawls withdraw from the toothed rod to make the toothed rod bidirectionally slidable.

DETAILED DESCRIPTION OF THE INVENTION

Figure 1:
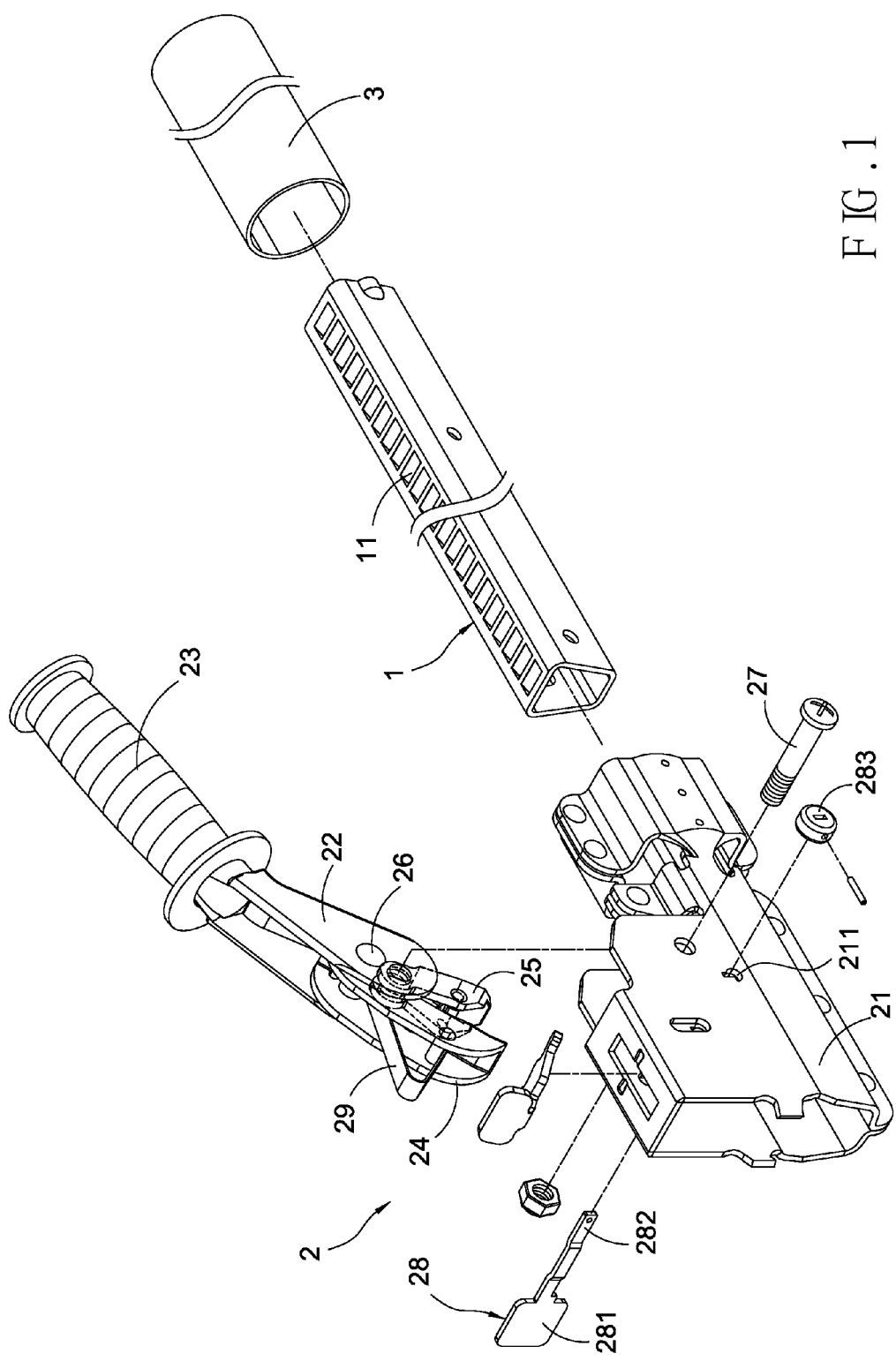
FIG. 1 is a concisely exploded view of the invention.

Please refer to FIG. 1. The cargo bar of the invention is composed of a stationary rod 3, a toothed rod 1 and a ratchet actuator 2. The stationary rod 3 is fastened to an end of the ratchet actuator 2 and the toothed rod 1 retractably passes through the ratchet actuator 2 and the stationary rod 3. Two outer ends of the stationary rod 3 and toothed rod 1 are fixed with two pads (not shown) for bearing against walls of a cargo compartment. One side of the toothed rod 1 is disposed with a series of slant teeth 11.

Figure 2:
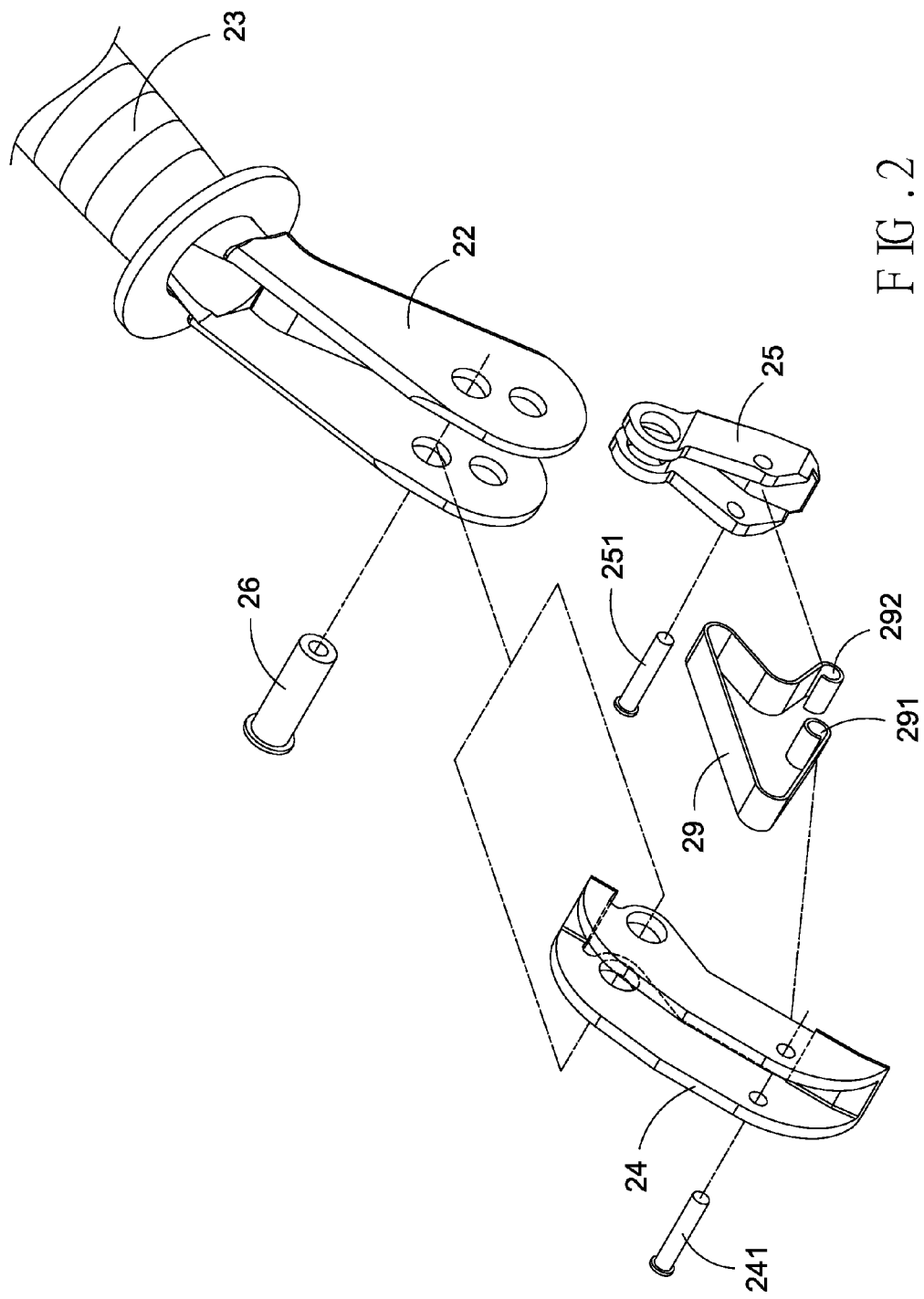
FIG. 2 is a detailedly exploded view of the invention.

Please jointly refer to FIGS. 1 and 2. The ratchet actuator 2 includes a wrench bar 22, a main pawl 24 and an auxiliary pawl 25, all of which are separately pivotally linked in a carriage 21. The two pawls 24, 25 are separately articulated to the wrench bar 22 with a first shaft 26 and a second shaft 27, respectively. The second shaft 27 penetrates through the carriage 21 to concurrently pivotally link the wrench bar 22 in the carriage 21. Free ends of the two pawls 24, 25 engage with two different teeth 11. An elastic member 29 is disposed between the two pawls 24, 25. Two ends of the elastic member 291, 292 are separately pivotally fixed to the main pawl 24 and auxiliary pawl 25 by two pins 241, 251. There is a handle 23 on an outer end of the wrench bar 22 for being held by a user.

Figure 3:
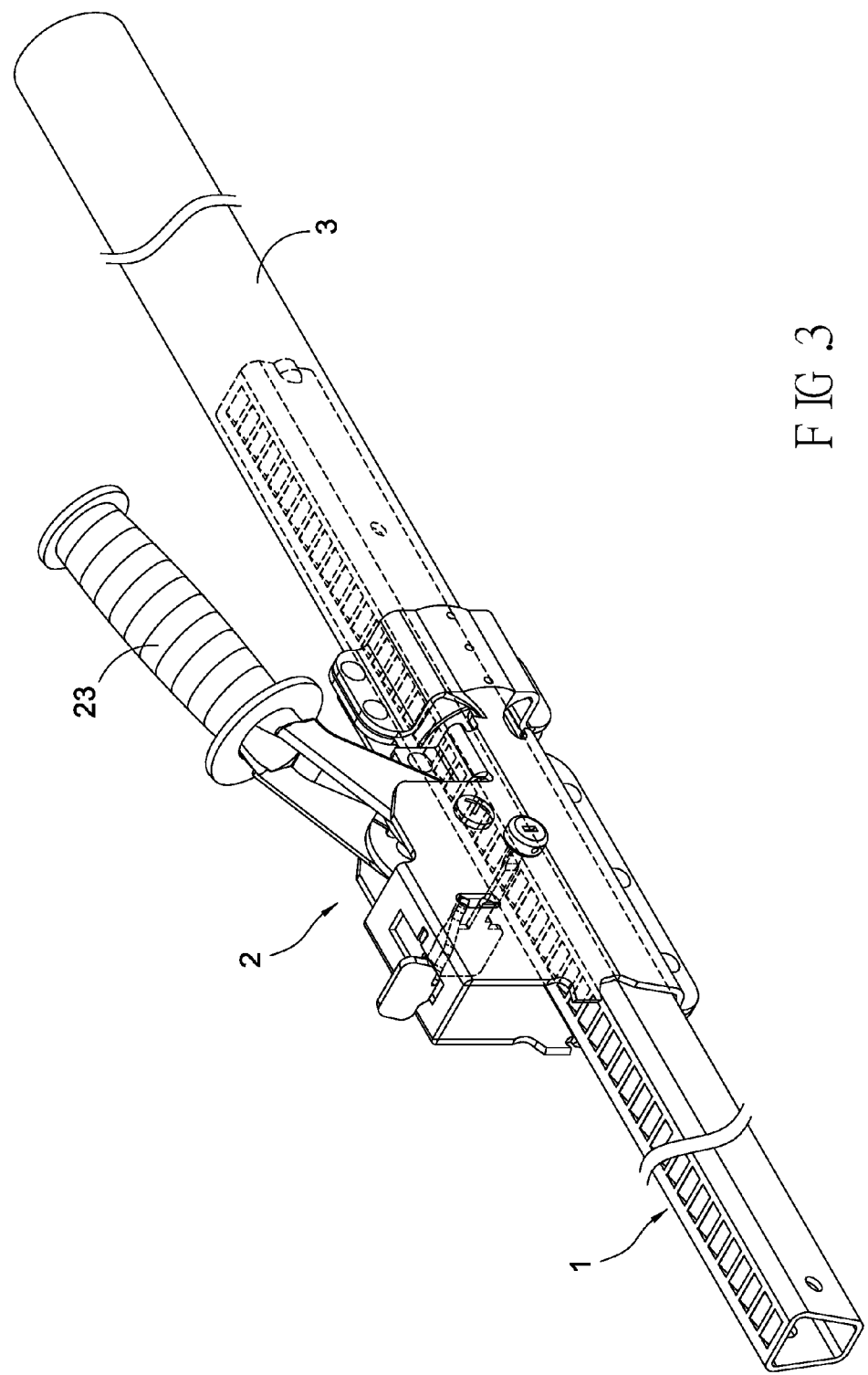
FIG. 3 is an assembled view of the invention.
Figure 4:
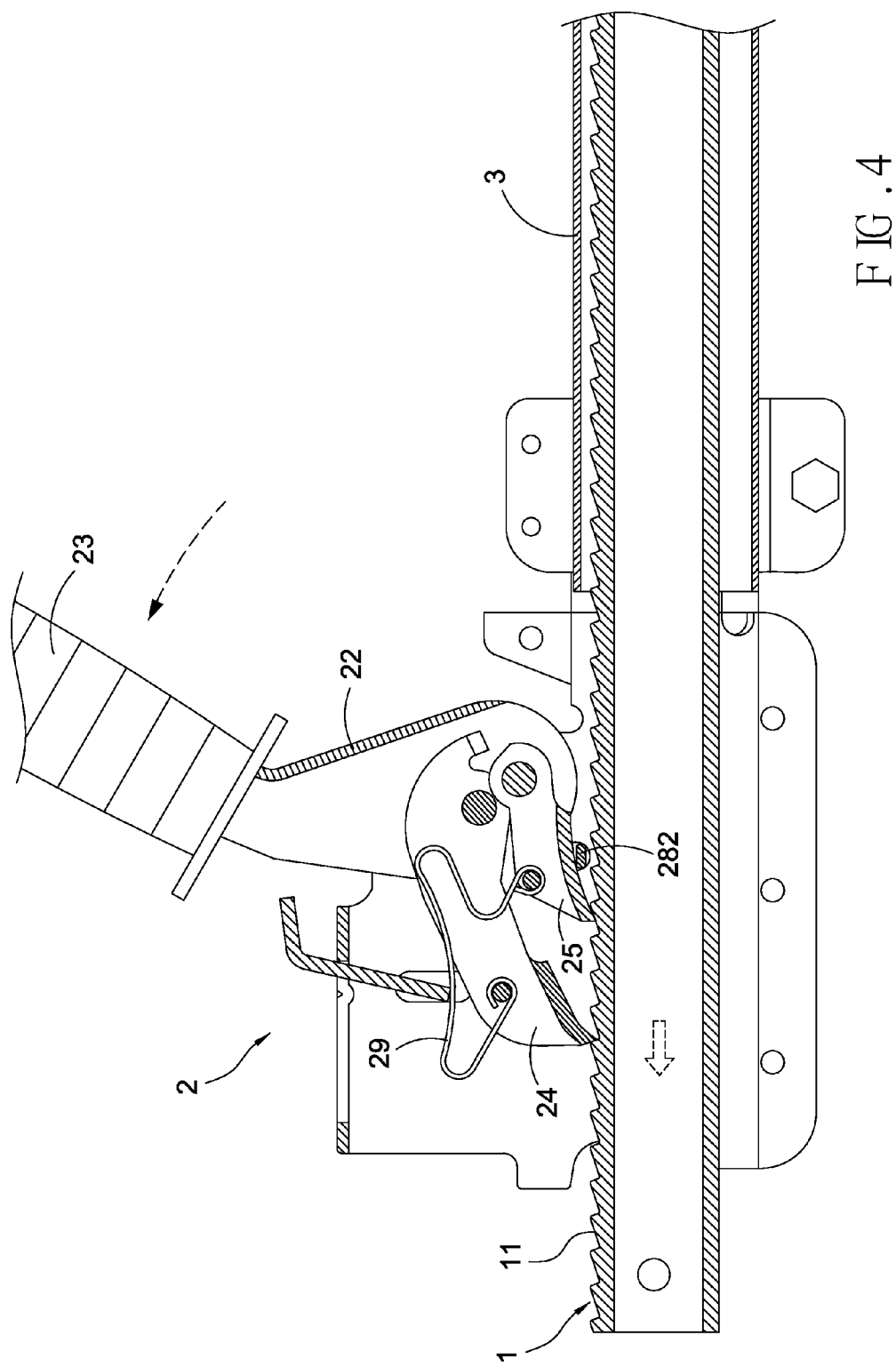
FIG. 4 is a longitudinal sectional view of the invention when the release key is at the ineffective position and the wench bar is moved upwards.

Please refer to FIG. 3. One end of the stationary rod 3 is fastened to the ratchet actuator 2. The toothed rod 1 can be elongated by the reciprocation of the handle 23. As a result, a total length constituted by the stationary rod 3 and toothed rod 1 will be progressively elongated. Please refer to FIGS. 4 and 5. By means of the pressure from the elastic member 29, the tips of the pawls 24, 25 normally press two of the teeth 11. When the handle 23 is moved upwards, the two pawls 24, 25 concurrently push the toothed rod 1 to shift outwards (i.e. the left side in the figure) as shown in FIG. 4. When the handle 23 is moved downwards after top dead center, the two pawls 24, 25 will be pulled back the original positions along by the teeth 11 to press another two of the teeth 11. By this means, the toothed rod 1 can be elongated step by step.

Please refer back to FIG. 1. The quick release mechanism of the invention is a release key 28 penetrating through the carriage 21. The release key 28 is formed by a shank 281 and a stick 282. The stick 282 is flat, that is width of the stick 282 is larger than thickness thereof. The carriage 21 is disposed with a substantially L-shaped through hole 211 for receiving the stick 282 to penetrate and rotate about 90 degrees. A user may rotate the release key 28 to a horizontal or vertical position. The horizontal position and the vertical position may be defined as an ineffective position and a release position, respectively. The shank 281 extends from the stick 280 for being held to rotate. Additionally, the free end of the stick 282, which protrudes from the carriage 21, may be disposed with a block 283 for preventing the release key 28 from withdrawing from the carriage 21.

Figure 5:
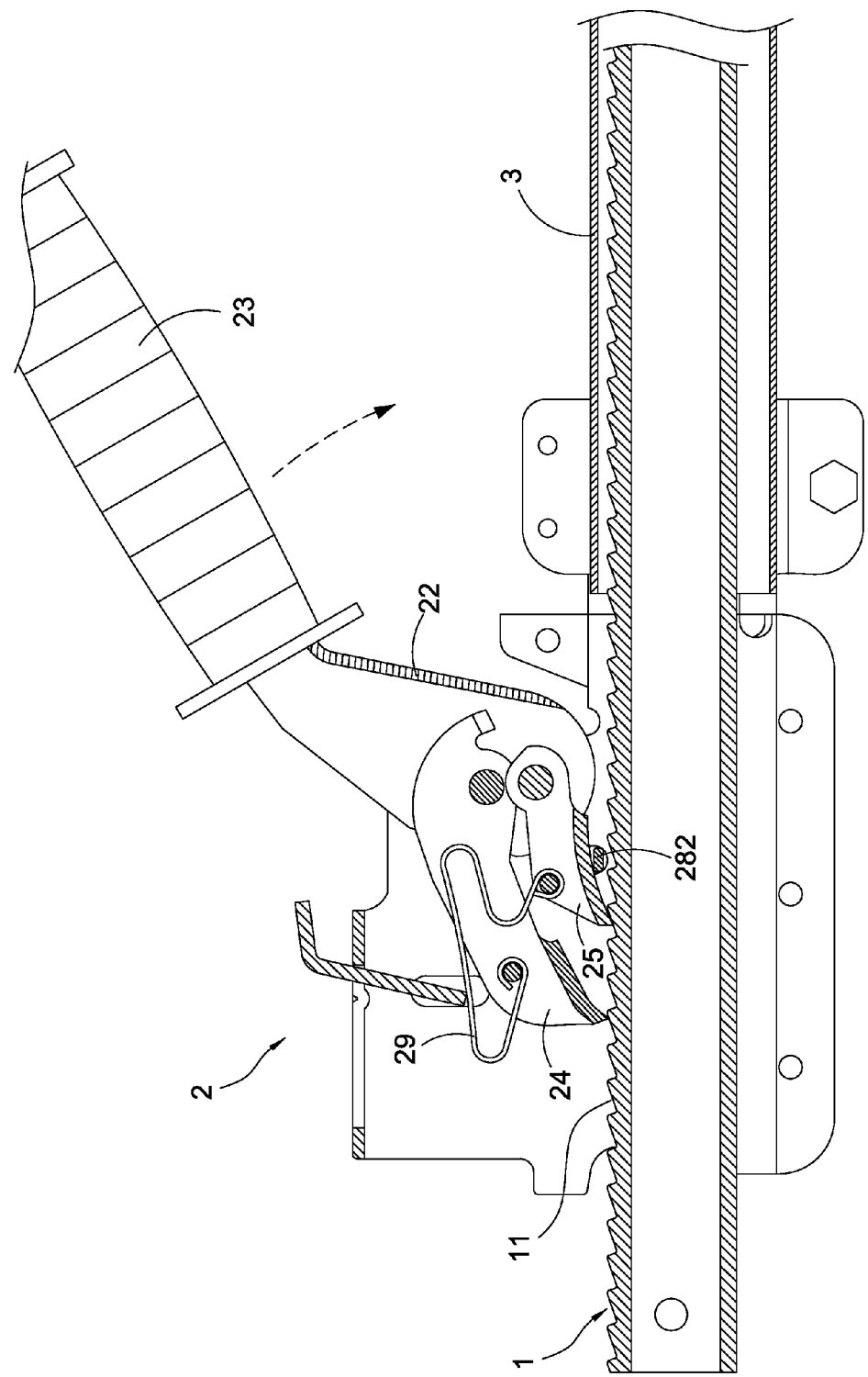
FIG. 5 is a longitudinal sectional view of the invention when the release key is at the ineffective position and the wench bar is moved downwards.
Figure 6:
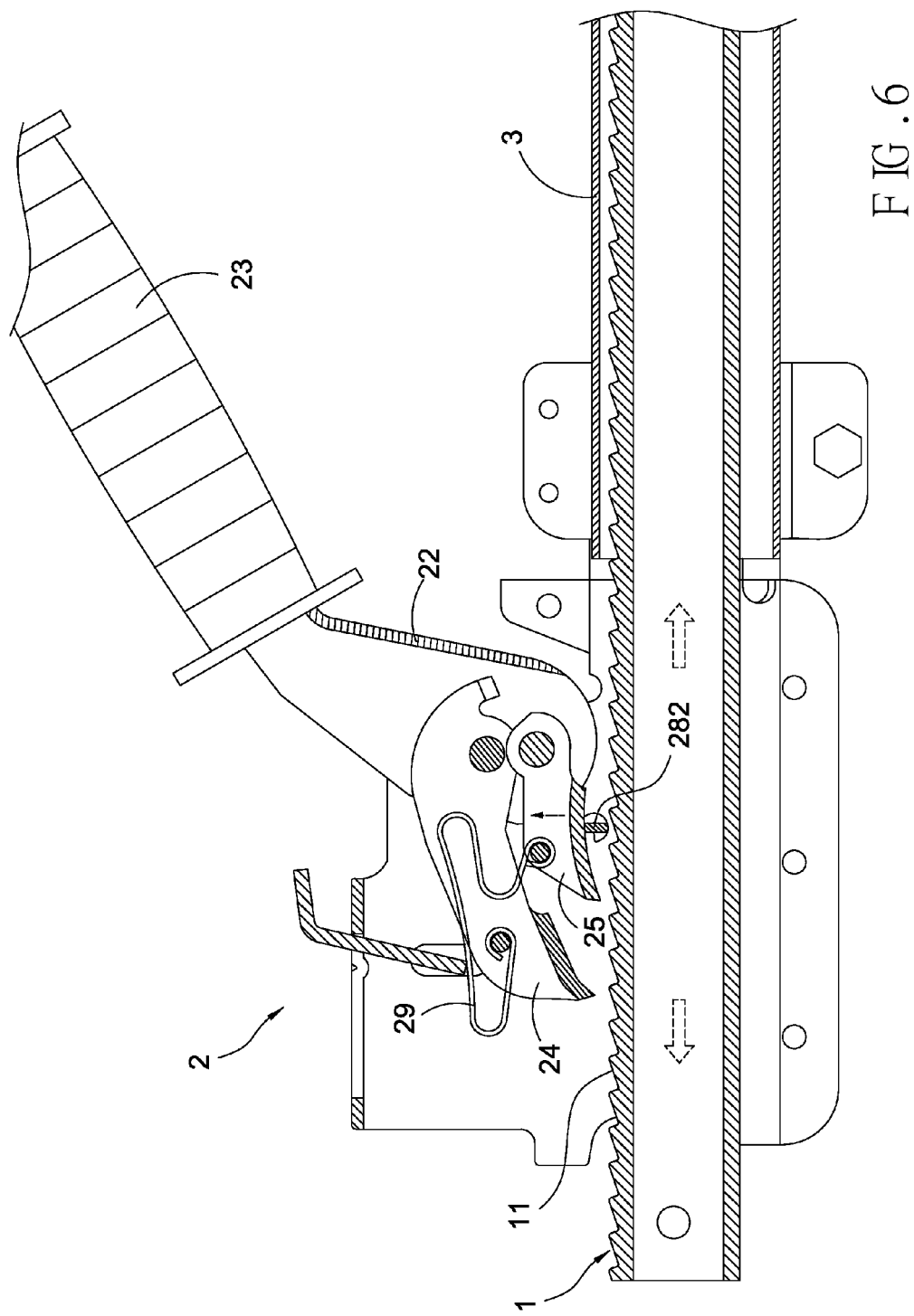
FIG. 6 is a longitudinal sectional view of the invention when the release key is at the release position.

The stick 282 is located between the auxiliary pawl 25 and the toothed rod 1. When the release key 28 is rotated at the ineffective position, as shown in FIGS. 4 and 5, the release key 28 is not in contact with the toothed rod 1 and the auxiliary pawl 25 and does not interfere with the motion of the auxiliary pawl 25. As a result, the elongating operation of the toothed rod 1 performed by the pawls 24, 25 can be normally progressed. While when the release key 28 is rotated to the release position as shown in FIG. 6, the stick 282 will elevate the auxiliary pawl 25 to withdraw from the teeth 11 of the toothed rod 1 due to its width larger than thickness. Also, the main pawl 24 is concurrently elevated to withdraw from the teeth 11 due to the effect of the elastic member 29. At this time, the toothed rod 1 will not be interfered by the pawls 24, 25 to be freely bidirectionally slidable. Users can use this release status to proceed with a coarse adjustment or to cloak the toothed rod 1 in the stationary rod 3.

As abovementioned, the invention can perform quick release by the single release key 28. Not only is the structure simplified, but also it is very easy to be assembled. Furthermore, the key shape is so durable and is hard to be bent or fractured.

It will be appreciated by persons skilled in the art that the above embodiment has been described by way of example only and not in any limitative sense, and that various alterations and modifications are possible without departure from the scope of the invention as defined by the appended claims. It will be appreciated by persons skilled in the art that the above embodiment has been described by way of example only and not in any limitative sense, and that various alterations and modifications are possible without departure from the scope of the invention as defined by the appended claims.

What is claimed is:

1. A cargo bar comprising:
a toothed rod having a series of slant teeth;
a ratchet actuator being movably penetrated through by the toothed rod, comprising:
  a carriage;
  a wrench bar, pivotally linked in the carriage with a second shaft, and provided with a handle;
  a main pawl, pivotally linked to the wrench bar with a first shaft, wherein a free end of the main pawl engages with one of the teeth;
  an auxiliary pawl, pivotally linked to the wrench bar concurrently with the second shaft, wherein a free end of the auxiliary pawl engages with one of the teeth;
  an elastic member disposed between the main pawl and the auxiliary pawl; and
  a release key, movably penetrating the carriage, formed with a shank and a stick, and being capable of rotating to an ineffective position and a release position, wherein the stick is located between the auxiliary pawl and the toothed rod, when the release key is rotated at the ineffective position, the release key is out of contact with the toothed rod and the auxiliary pawl, and when the release key is rotated to the release position, the stick elevates the auxiliary pawl to withdraw from the teeth of the toothed rod and the main pawl is concurrently elevated to withdraw from the teeth by the elastic member.

2. The cargo bar of claim 1, wherein width of the stick is larger than thickness thereof.

3. The cargo bar of claim 1, wherein the carriage is disposed with a substantially L-shaped through hole for receiving the stick of the release key.

4. The cargo bar of claim 2, wherein the carriage is disposed with a substantially L-shaped through hole for receiving the stick of the release key to be rotated about 90 degrees.

5. The cargo bar of claim 1, wherein the shank extends from an end of the stick.

6. The cargo bar of claim 1, wherein a protrudent end of the stick is disposed with a block against the carriage.

* * * * *